(12) United States Patent
Okuyama

(10) Patent No.: US 6,679,369 B2
(45) Date of Patent: Jan. 20, 2004

(54) MACHINE TOOL AND ASSOCIATED PALLET CHANGER

(75) Inventor: Yoshinobu Okuyama, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/984,120

(22) Filed: Oct. 29, 2001

(65) Prior Publication Data

US 2002/0060127 A1 May 23, 2002

(30) Foreign Application Priority Data

Oct. 27, 2000 (JP) ........................................ 2000-328301

(51) Int. Cl.$^7$ ............................................... B65G 47/00

(52) U.S. Cl. ................ 198/346.1; 29/33 P; 414/222.07

(58) Field of Search .......................... 198/346.1, 465.1; 29/33 P, 563; 414/222.07

(56) References Cited

U.S. PATENT DOCUMENTS

| | | | | |
|---|---|---|---|---|
| 3,825,245 A | * | 7/1974 | Osburn et al. | ........... 198/346.1 |
| 4,656,949 A | * | 4/1987 | Ragot | ...................... 198/465.1 |
| 5,346,051 A | | 9/1994 | Keith | |
| 6,435,330 B1 | * | 8/2002 | Bonora et al. | ........... 198/346.1 |

FOREIGN PATENT DOCUMENTS

| | | |
|---|---|---|
| DE | 196 23 080 C | 2/1998 |
| WO | WO 99/50020 A | 10/1999 |

* cited by examiner

Primary Examiner—Joseph E. Valenza
(74) Attorney, Agent, or Firm—Smith Patent Office

(57) ABSTRACT

A machine tool has a pallet changer at a front of a machine body for automatically changing a preceding-process pallet loaded with a machined workpiece thereon for a next-process pallet loaded with an unmachined workpiece thereon. A working space is provided between the machine body and the pallet changer. Thus, a machine tool, as well as a pallet changer used in the machine tool can be provided that allows a working space to be ensured without causing any complications for the structure and that has a wide range of applications.

7 Claims, 6 Drawing Sheets

MACHINE TOOL AND ASSOCIATED PALLET CHANGER

BACKGROUND OF THE INVENTION

1. Field of the Invention

The present invention relates to a machine tool equipped with a pallet changer for automatically replacing a preceding-process pallet with a next-process pallet. The invention also relates to the pallet changer.

2. Discussion of the Related Art

Machine tools such as vertical machining centers are generally equipped with a pallet changer. Upon completion of the machining operation of a workpiece on a preceding-process pallet placed on a machining table, the machine tool automatically changes the preceding-process pallet with a next-process pallet on which an unmachined workpiece is held and which has been stationed in a setup position.

Conventional pallet changers of this kind include, for example, those of the pivot type where a pivot arm is provided between a machine-side changing position and a setup position. Additionally, the advancing-and-retreating pivot type where a pivot arm is advanced and retreated and further pivoted have been provided. These pallet changers are disposed close to the machine tool.

The pivot-type pallet changers described above have to be located close to the machine tool for structural reasons. This results in a problem because the pallet changer obstructs the maintenance work of the machine tool operator thereby making it difficult to ensure the proper working space.

For the type of pallet changer where the pivot arm is advanced and retreated, the working space cannot be ensured by making the pallet changer retreatable to a position away from the machine tool. If one tries to make the pallet changer retreatable to a position located away from the machine tool, the pallet changer becomes complex in structure and moreover, in some cases, this structure could not be adopted due to the structure of the replacement position of the machine tool.

SUMMARY OF THE INVENTION

An object of the invention is to provide a machine tool, as well as a pallet changer therefor, which allows a working space around the machine tool to be ensured without causing any complications in the structure and which is also applicable to a wide range of applications.

In order to achieve the above and other objects of the invention, according to a first aspect of the invention there is provided a machine tool which comprises a pallet changer at a front of a machine body for automatically changing a preceding-process pallet loaded with a machined workpiece thereon with a next-process pallet loaded with an unmachined workpiece thereon, wherein a working space is provided between the machine body and the pallet changer.

In a second aspect of the invention, there is provided a pallet changer for use in a machine tool to automatically change a preceding-process pallet disposed in a machine-side changing position and loaded with a machined workpiece thereon with a next-process pallet disposed in a setup position and loaded with an unmachined workpiece thereon, said pallet changer comprising: a relay changer mechanism for advancing and retreating at least one of the preceding-process pallet and the next-process pallet between the machine-side changing position and a relay changing position; and a pivotal changer mechanism for changing the preceding-process pallet with the next-process pallet by a pivoting operation in a position between the relay changing position and the setup position.

In a third aspect of the invention, there is provided a pallet changer for use in a machine tool as described in the second aspect, wherein the relay changer mechanism advances and retreats the preceding-process pallet and the next-process pallet through up-and-down and advance-and-retreat linear motions for lifting the preceding-process pallet disposed in the machine-side changing position and the next-process pallet disposed in the relay changing position, thereafter linearly conveying the preceding-process pallet to a site upward of the relay changing position and the next-process pallet to a site upward of the machine-side changing position, and further lowering the preceding-process pallet to the relay changing position and the next-process pallet to the machine-side changing position.

In a fourth aspect of the invention, there is provided a pallet changer for use in a machine tool as described in the fourth aspect, wherein the relay changer mechanism comprises a first arm member mounted on a frame member so as to be advanceable and retreatable, and a second arm member supported on the first arm member so as to be advanceable and retreatable relative to the first arm member, and a speed-increasing mechanism is further provided between the first arm member and the second arm member for advancing and retreating the second arm member by making use of the advance-and-retreat motions of the first arm member.

In a fifth aspect of the invention, there is provided a pallet changer for use in a machine tool as described in the fourth aspect, wherein the speed-increasing mechanism is structured so that the first arm member is equipped with a driving-side chain mechanism and a driven-side chain mechanism, each having an endless chain on a pair of sprockets disposed so as to be spaced from each other in an advance-and-retreat direction, one-end side sprockets of the two chain mechanisms being coaxially and co-rotationally connected to each other, the chain of the driving-side chain mechanism being fixed to the frame member and the chain of the driven-side chain mechanism being connected to the second arm member.

According to the first aspect of the invention, since the working space is provided between the machine body and the pallet changer, the operator is allowed to perform tool maintenance as well as other work on the machine body side while being positioned in the working space. Thus, the workability of the machine tool can be improved.

According to the second aspect of the invention, since the relay changer mechanism for advancing and retreating the preceding-process pallet and the next-process pallet between the machine-side changing position and the relay changing position is provided, the pivotal changer mechanism can be placed away from the machine tool without complicating the structure of the pivotal changer mechanism. This allows the working space to be ensured between the machine tool and the pallet changer and thus the workability of the machine tool can be improved.

Further, since the relay changer mechanism advances and retreats to advance and retreat the pallet placed at the machine-side changing position or the pallet placed at the relay changing position, the relay changer mechanism is structurally adaptable to the changing positions of the machine tool. This allows the range of applications to be widened.

According to the third aspect of the invention, since the relay changer mechanism advances and retreats the preceding-process pallet and the next-process pallet through up-and-down and advance-and-retreat linear motions for lifting the preceding-process pallet placed at the machine-side changing position and the next-process pallet is placed at the relay changing position, it linearly conveys the preceding-process pallet to a site upward of the relay changing position and it conveys the next-process pallet to a site upward of the machine-side changing position. Also it further lowers the preceding-process pallet to the relay changing position and the next-process pallet to the machine-side changing position. As a result of this, it becomes possible to propose a concrete structure that allows the pallets to be advanced and retreated or seated along with each other as described in the first aspect.

According to the fourth aspect of the invention the relay changer mechanism is equipped with a speed-increasing mechanism between a first arm member and a second arm member supported on the first arm member. The relay changer mechanism serves to advance and retreat the second arm member by making use of advance-and-retreat motions of the first arm member. As a result of this, the second arm member can be advanced and retreated to a greater extent only by driving the first arm member. This allows the working space to be ensured more securely while any complication in the structure can be suppressed.

According to the fifth aspect of the invention, the speed-increasing mechanism is so constructed that the first arm member is equipped with a driving-side chain mechanism and a driven-side chain mechanism. Also one-end side sprockets of the two chain mechanisms are coaxially and co-rotationally connected to each other. The chain of the driving-side chain mechanism is fixed to the frame member and the chain of the driven-side chain mechanism is connected to the second arm member. As a result of this arrangement, it becomes possible to achieve a structure that allows the speed-increasing mechanism to advance and retreat the second arm member to a greater extent only by driving the first arm member to advance and retreat.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Figure 1:
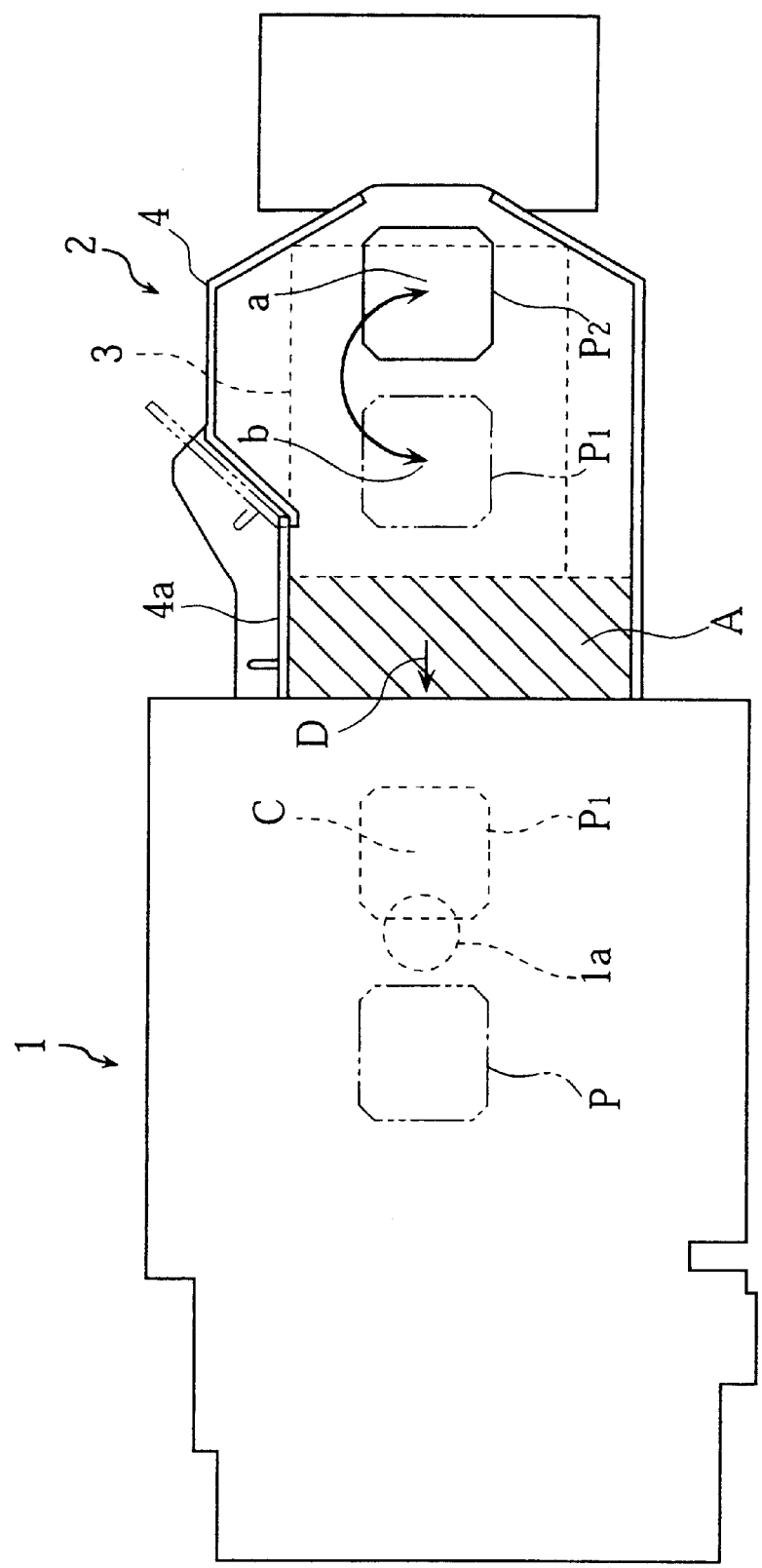
FIG. 1 is an arrangement diagram of a pallet changer of a machine tool according to an embodiment of the invention.

Hereinbelow, an embodiment of the present invention is described with reference to the accompanying drawings.

In the figures, there is provided a vertical machining center 1 and a pallet changer 2. The vertical machining center 1 moves a vertically disposed spindle 1a in an X-direction (the left-and-right directions as viewed from the machine front in a direction of arrow D) and a Z-direction (the up-and-down directions as similarly viewed) to thereby move a table in a Y-direction (the back-and-forth directions as similarly viewed). This allows a workpiece set on a pallet P mounted on the table to be subjected to the required machining.

The pallet changer 2 is constructed so that a changer body 3 is installed in the front of the vertical machining center 1. A required working space A is surrounded by a cover 4. Further, the cover 4 is provided with a door 4a for an operator to come into and out of the working space A.

The changer body 3 comprises a frame member 5 fixed on an anchor base, a pivotal changer mechanism 6 mounted on a rear portion (the portion located farther from the machining center 1) of the frame member 5, and an advanceable-and-retreatable relay changer mechanism 7 mounted on a front portion (the portion located closer to the machining center 1) of the frame member 5.

Figure 2:
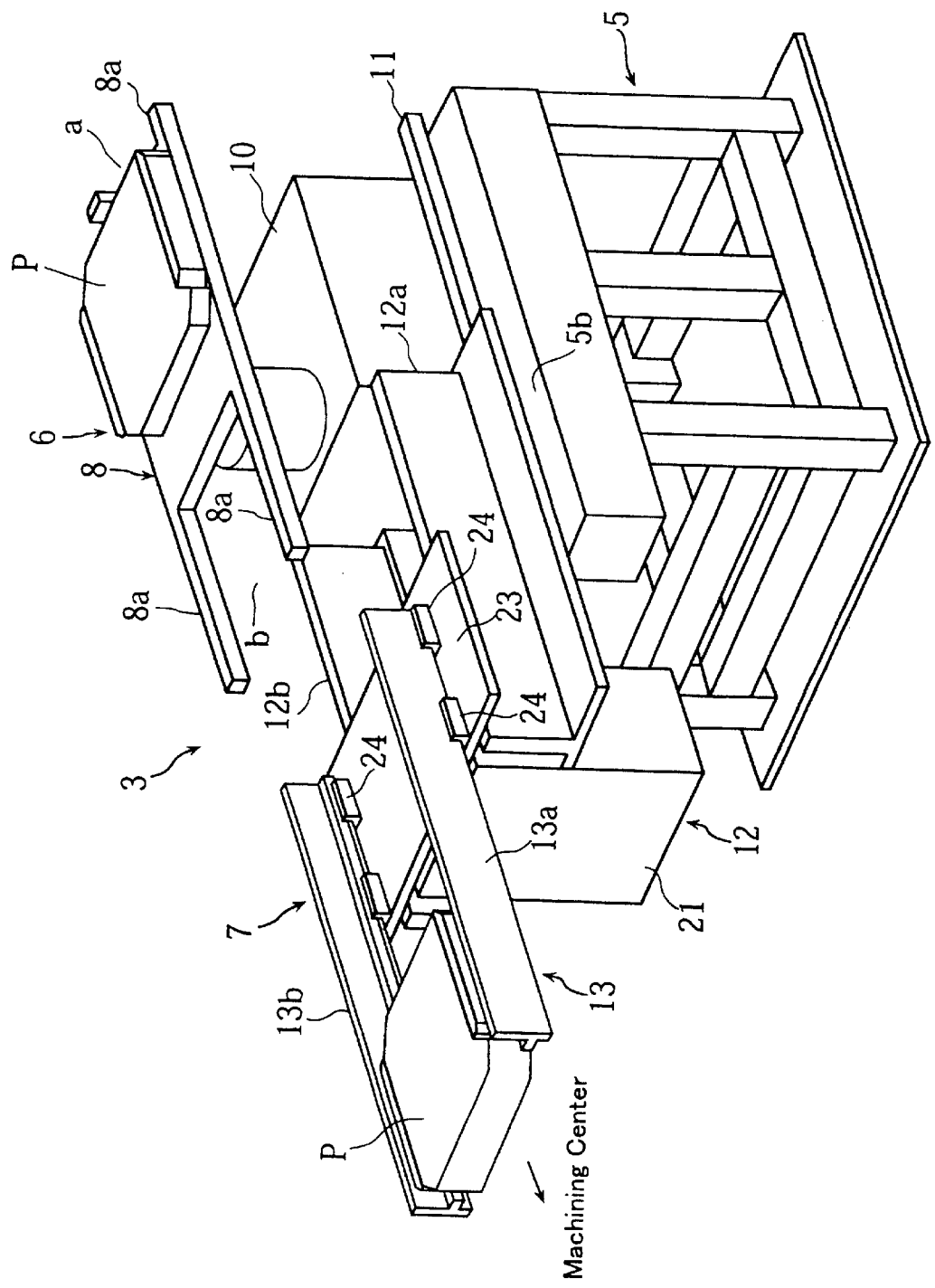
FIG. 2 is a schematic perspective view of the pallet changer according to an embodiment of the invention.

The frame member 5 is formed from a steel material into a table that has high rigidity and is fixed on the anchor base. On the rear portion of the frame member 5, a base portion 10 is provided so as to project upwardly for pivotally mounting the pivotal changer mechanism 6 thereon. Also, a pair of left-and-right guide rails 11 for advanceably and retreatably supporting the relay changer mechanism 7 are placed on a table surface 5b of the frame member 5, so as to extend in the back-and-forth directions (the left-and-right directions in FIG. 2) with the base portion 10 sandwiched therebetween.

The pivotal changer mechanism 6 is constructed so that a pivot arm 8 that is pivotally disposed on the base portion 10 of the frame member 5 is pivotally driven by a pivot drive motor housed and placed in the base portion 10. The pivot arm 8 has a pair of left-and-right forks 8a each extending forwardly and rearwardly so as to generally form an H-shape. The pivot arm 8 pivots 180 degrees between a setup position 'a' (where setup work of loading or unloading a workpiece onto or from a next-process pallet P2 is performed) and a relay changing position 'b' (where the pallet P is replaced with another one in association with the relay changer mechanism 7).

The relay changer mechanism 7 includes a first arm member 12 that is advanceably and retreatably supported by the left-and-right guide rails 11 of the frame member 5. The relay changer mechanism 7 also includes a second arm member 13 that is advanceably and retreatably and vertically movably supported by the first arm member 12. The relay changer mechanism also includes a first advance-and-retreat drive mechanism 14 for driving the first arm member 12 to advance and retreat, a second advance-and-retreat drive mechanism 15 for driving the second arm member 13 to advance and retreat by making use of the movement of the first arm member 12, and an up-and-down drive mechanism 16 for driving the second arm member 13 upwardly and downwardly.

The first arm member 12 is formed into a generally U-shape, when viewed in a plan view. A pair of left and right base arms 12a, 12b are advanceably and retreatably supported by the left-and-right guide rails 11 and have an inverted T-shape as viewed in cross section. They are connected to each other at their front portions by a retainer casing 21. These base arms 12a, 12b, have a front-and-rear pair of linear guides 17 fixed to their respective bottom faces so as to be spaced in the back-and-forth direction. These base arms 12a, 12b are made advanceable and retreatable in the back-and-forth direction by virtue of the linear guides 17 fixed to the guide rails 11.

A bar-shaped rack bar 18 having rack teeth at its bottom face is fixed to a lower-end outer side face of the left-side base arm 12a. This rack bar 18 is engaged with a pinion 19. The pinion 19 is fixedly mounted on an output shaft 20a of an advance-and-retreat drive motor 20. This advance-and-retreat drive motor 20 is fixedly supported on the frame member 5. The first advance-and-retreat drive mechanism 14 advances and retreats the first arm member 12 by rotating the advance-and-retreat drive motor 20.

The retainer casing 21 is formed into a rectangular cylindrical shape, and a rectangular-cylindrical shaped guide casing 22 is inserted in the retainer casing 21 so as to be movable up and down. Also, a base plate 23 is fixed to an upper end of the guide casing 22.

Back-and-forth guide bars 27a for preventing back-and-forth vibrations of the guide casing 22 are fixed on outer surfaces of left-and-right side walls 22a, 22b of the guide casing 22. Also left-and-right guide bars 27b are fixed on an outer surface of a front side wall 22c for preventing left-and-right vibrations of the guide casing 22. The back-and-forth guide bars 27a and the left-and-right guide bars 27b are both fixed along the vertical direction. Then, these guide bars 27a, 27b are guided by guide rollers 28a, 28b. The guide rollers 28a, 28b are fixed to the left-and-right side walls 21a and a front wall 21b of the retainer casing 21.

A piston rod 29a of a hydraulic cylinder 29 for the up-and-down drive mechanism 16 is coupled to a bottom face of the base plate 23, and the hydraulic cylinder 29 is supported by a bottom wall 21c of the retainer casing 21. In this way, expansion and contraction of the hydraulic cylinder 29 causes the base plate 23 and the second arm member 13 to move up and down.

A pair of front-and-rear linear guides 24 are fixedly placed at both side portions of the base plate 23 so as to be spaced in the back-and-forth direction. A guide rail 25 fixed to the bottom faces of the left-and-right arms 13a, 13b of the second arm member 13 is advanceably and retreatably supported by the linear guides 24.

The second advance-and-retreat drive mechanism 15 that advances and retreats the second arm member 13 is construed as follows. Although this second advance-and-retreat drive mechanism 15 is provided with a pair of left and right drive mechanisms, the description is only given for the left-side second advance-and-retreat drive mechanism 15 because the paired mechanisms are of the same construction.

A spline shaft 30 and a sprocket shaft 34 are disposed on an outer side face of the left-side base arm 12a. The spline shaft 30 is supported by the base arm 12a via a lower bearing 31 so as to be rotatable and movable up-and-down.

An upper portion of the spline shaft 30 is rotatably and axially immovably supported by an upper bearing 32 fixedly supported to the base plate 23. Also, at a generally middle portion of the spline shaft 30, a lower sprocket 33a is set so as to be capable of transferring rotational force to the spline shaft 30 as well as axially movement.

The sprocket shaft 34 is rotatably supported by the base arm 12a via a bearing 35, and a lower sprocket 33b is fixed to a lower portion of the sprocket shaft 34. A lower chain 36 is wound and stretched on the two lower sprockets 33a, 33b. This lower chain 36 has its connecting portion 36a attached to a fixed member 5b erectly provided on the frame member 5. In this way, a lower chain mechanism (driving-side chain mechanism) 43 is provided for rotating the spline shaft 30 along with advancing or retreating the first arm member 12.

Further, a sprocket shaft 37 is provided on the base plate 23, and an upper sprocket 39a is rotatably supported by the sprocket shaft 37 via a bearing 38. An upper chain 40 is wound and stretched on the upper sprocket 39a and an upper sprocket 39b fixedly mounted at an upper end of the spline shaft 30.

A total of four drive rollers 41 are provided at specified intervals on the upper chain 40. These rollers 41 are engageable with hooks 42 formed on the outer side faces of the left-and-right arms 13a, 13b of the second arm member 13. In this way, an upper chain mechanism (driven-side chain mechanism) 44 is provided in which the upper chain 40 is rotated along with rotation of the spline shaft 30. This causes the rollers 41 to engage with the hooks 42 so that the left-and-right arms 13a, 13b are advanced and retreated.

Next, the operation and working effects of the equipment according to this embodiment are described.

Assume that a preceding-process pallet P1 placed at a changing position 'c' on the machining center 1 side is changed with a next-process pallet P2 placed at the setup position 'a' of the pivotal changer mechanism 6. The relay changer mechanism 7 first advances. Then it goes up to allow the preceding-process pallet P1 at the changing position 'c' to be mounted thereon. It then retreats to convey the preceding-process pallet P1 to the relay changing position 'b,'. It then goes down and moves and sets the preceding-process pallet P1 onto the pivot arm 8 of the pivotal changer mechanism 6. The pivotal changer mechanism 6 replaces the set preceding-process pallet P1' with the next-process pallet P2 by executing a 180° turn. Thereafter, the relay changer mechanism 7 goes up to allow the next-process pallet P2 to be mounted thereon. The relay changer mechanism 7 then conveys it to the machine-side changing position 'c,' and then it goes down and moves the next-process pallet P2 to the changing position 'c.'

Figure 3:
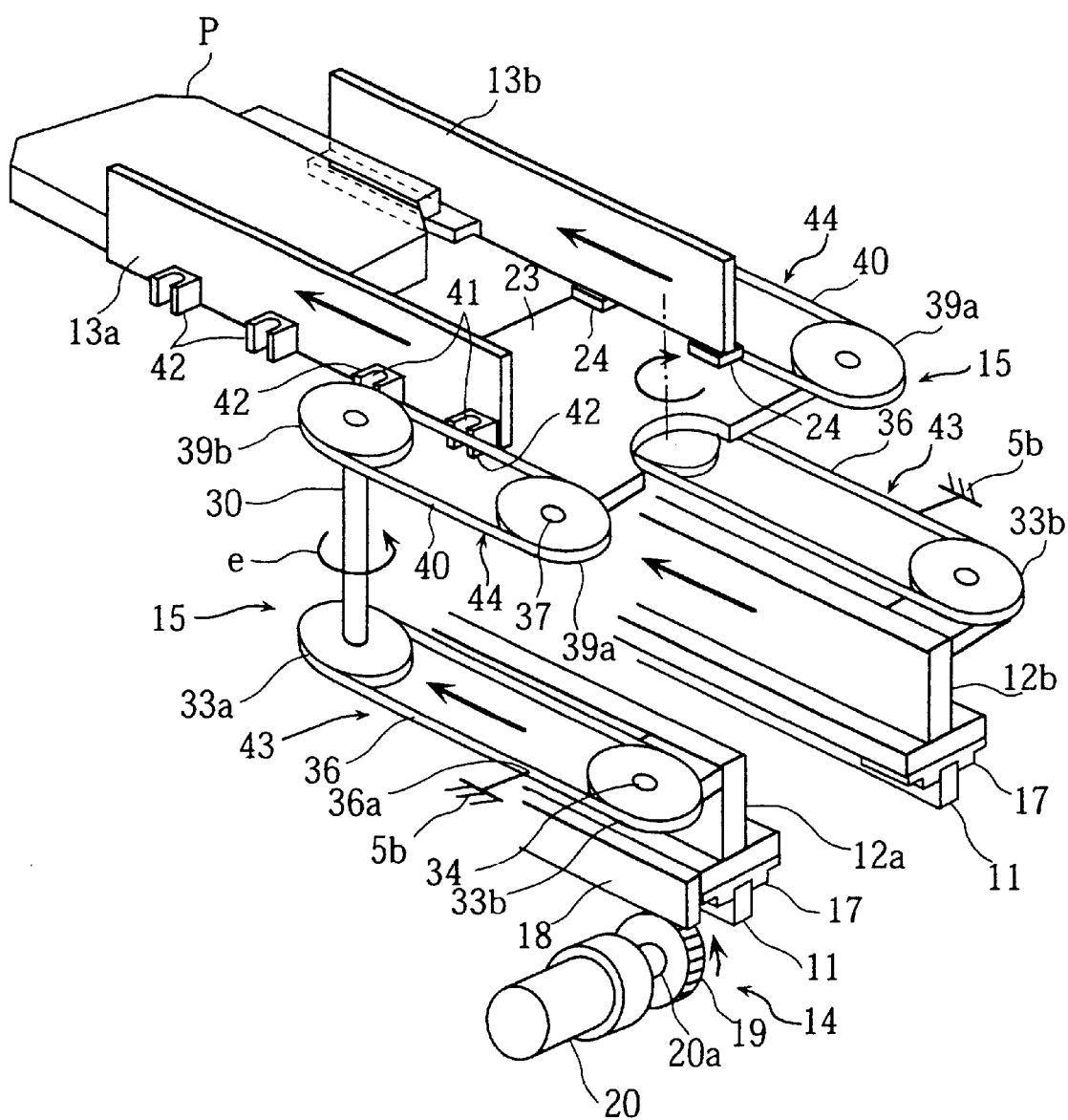
FIG. 3 is a schematic perspective view of an advance-and-retreat drive mechanism for the pallet changer according to an embodiment of the invention.
Figure 4:
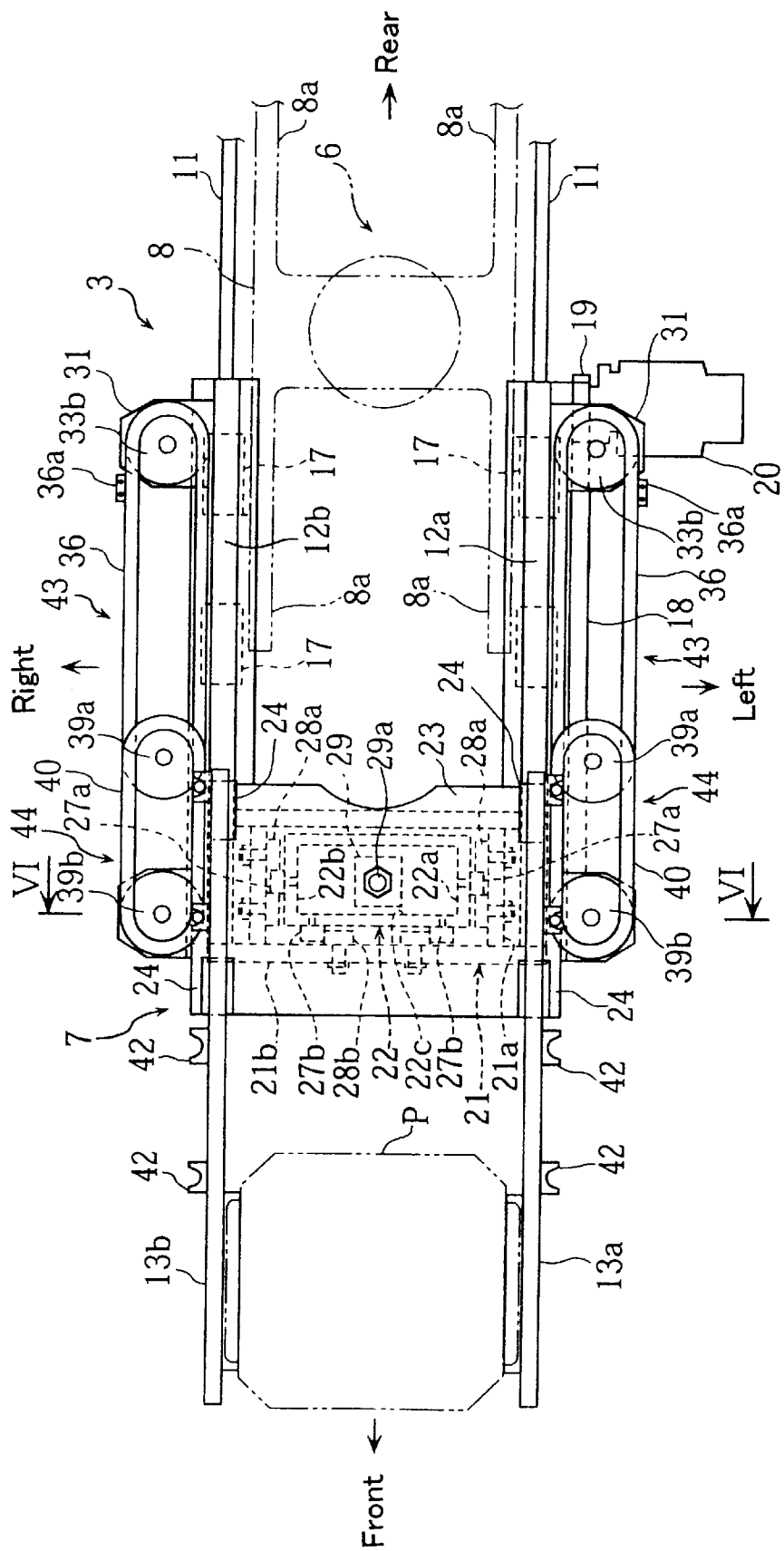
FIG. 4 is a plan view of the pallet changer according to an embodiment of the invention.
Figure 5:
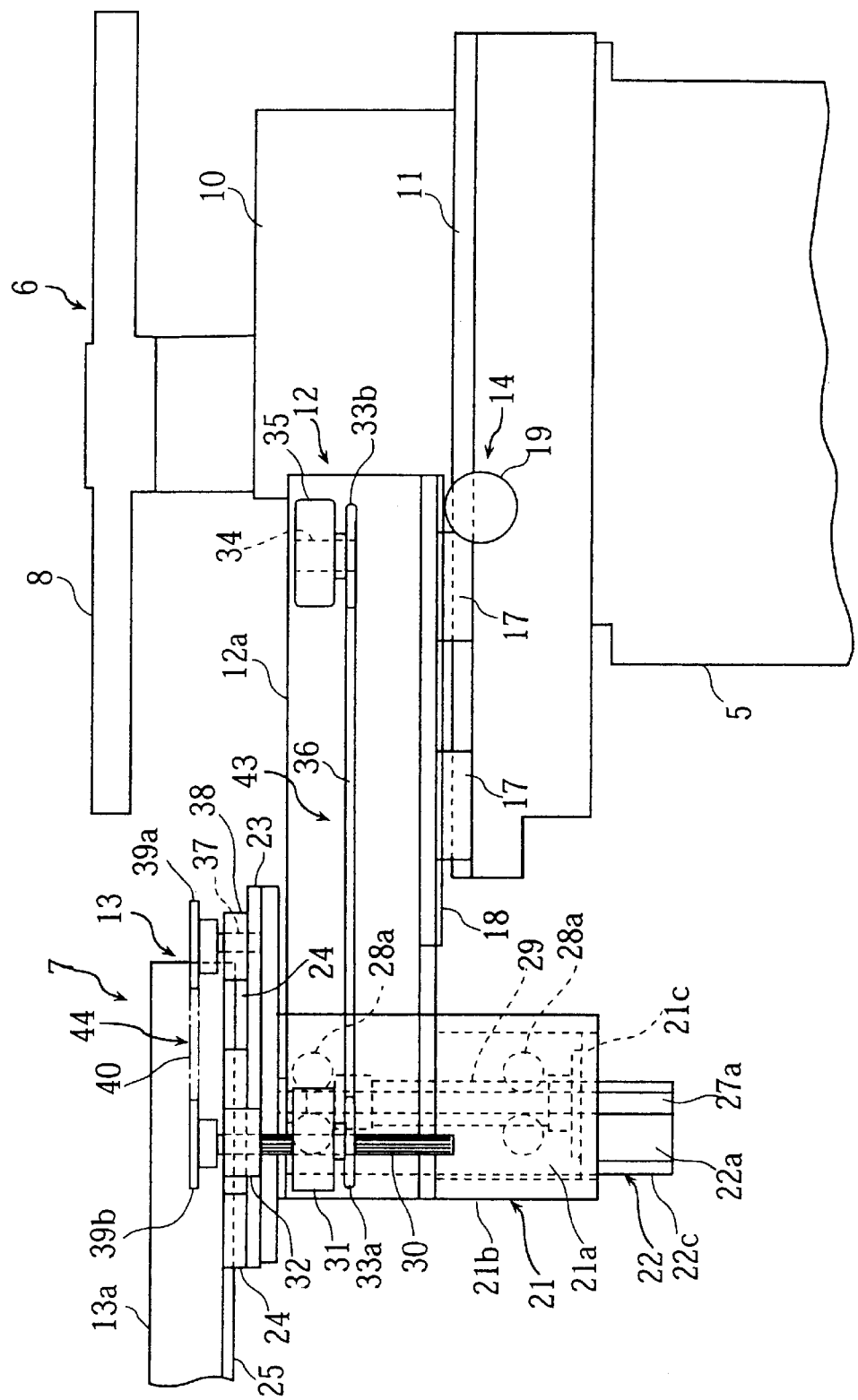
FIG. 5 is a side view of the pallet changer according to an embodiment of the invention.
Figure 6:
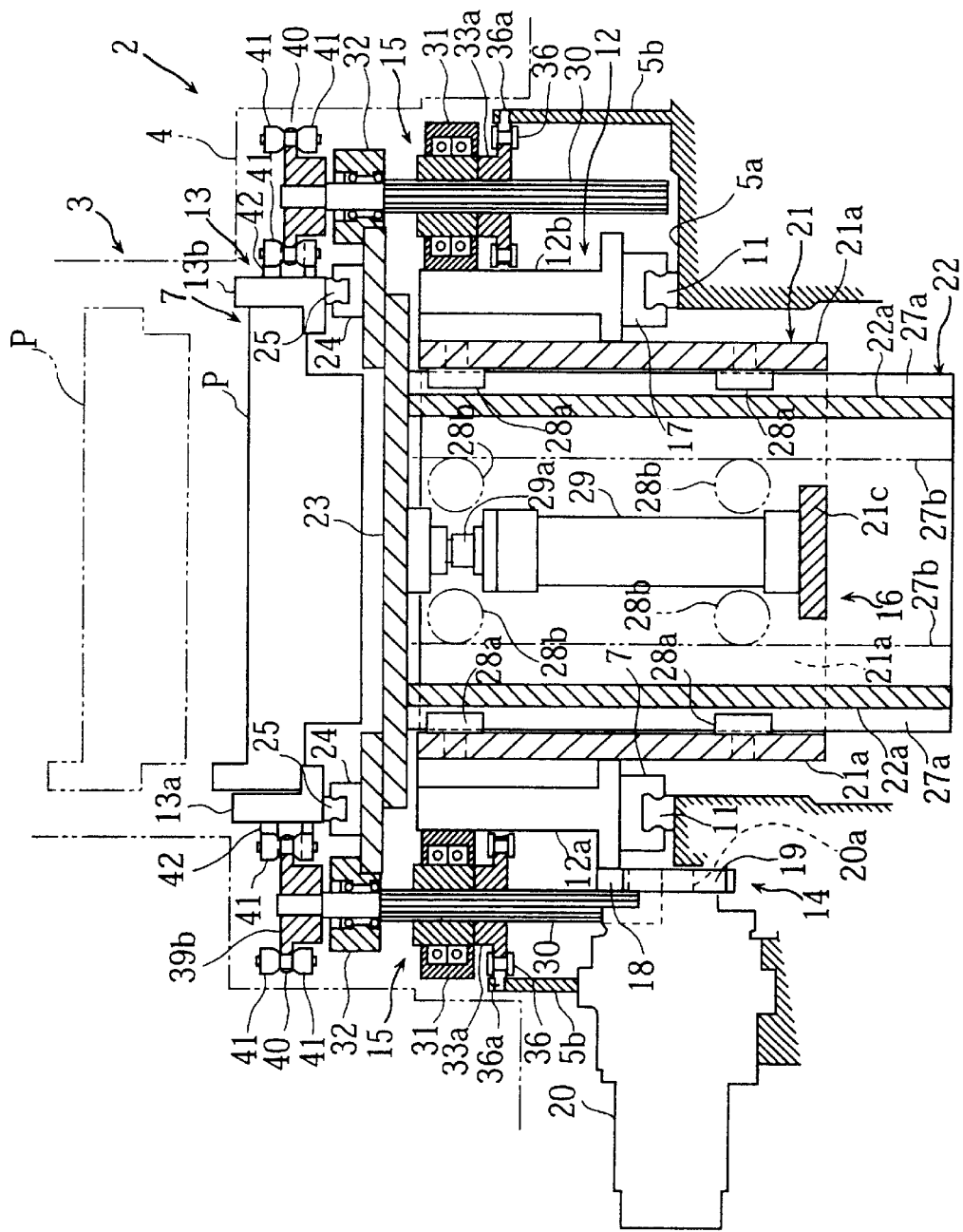
FIG. 6 is a sectional view taken along the line VI—VI of FIG. 4 according to an embodiment of the invention.

More specifically, the advance-and-retreat drive motor 20 makes the first arm member 12 advance leftward in FIG. 3. Then, along with its advancement, the lower chain 36 rotates the spline shaft 30 in the direction of the arrow 'e,'. Also, the upper chain 40 makes the roller 41 advance by rotation of the spline shaft 30, causing the roller 41 to engage with the hook 42. This action makes the second arm member 13 advance. In this operation, travel of the upper arm member 13 with respect to the frame member 5 is approximately twice as large as that of the lower arm member 12. This also approximately doubles the travel speed.

This advancement allows the front portion of the upper arm member 13 to enter under the preceding-process pallet P1 placed at the machine-side changing position 'c,'. The hydraulic cylinder 29 then elongates, causing the upper arm member 13 to go up, wherein the preceding-process pallet P1 is mounted on the upper arm member 13. In addition, along with this upward movement, the spline shaft 30 goes up within the lower bearing 31 and the lower sprocket 33a.

With the preceding-process pallet P1 mounted on the second arm member 13, the drive motor 20 makes the first arm member 12 retreat. Then, along with this retreat, the lower chain 36 makes the spline shaft 30 rotate so that the upper chain 40 is rotated by the rotation of the spline shaft 30. Also the roller 41 engages with the hook 42, making the second arm member 13 retreat. In this operation, the travel amount of the upper arm member 13 with respect to the frame member 5 is approximately double that of the lower arm member 12. This also approximately doubles the travel speed. Also in this operation, both the first and second arm members 12, 13 retreat from the working space A, so that the working space A is cleared inside, allowing the operator to open the door 4a and enter into the working space A without any difficulty. This enables the operator to do any necessary work.

As a result of the retreat, the preceding-process pallet P1 is disposed upwardly of the relay changing position 'b' for the pivot arm 8 of the pivotal changer mechanism 6. In this state the hydraulic cylinder 29 goes down, causing the preceding-process pallet P1' to be moved onto the pivot arm 8.

Thereafter, the pivotal changer mechanism 6 pivots the pivot arm 8, causing the preceding-process pallet P1' to be pivotally moved toward the setup position 'a'. This state is kept on standby until the machining by the machining center 1 is completed. During this standby period, the next-process pallet P2 is prepared on the setup position 'a' side.

As shown above, since the relay changer mechanism 7 is provided in this embodiment for advancing and retreating the preceding-process pallet P1 or the next-process pallet P2 between the machine-side changing position 'c' and the relay changing position 'b', the pivotal changer mechanism 6 can be placed away from the machining center 1 without complicating the structure of the pivotal changer mechanism 6. This allows the working space A to be ensured between the machining center 1 and the pallet changer body 3, so that the workability of the machine tool can be improved.

Also, since the relay changer mechanism 7 operates for up-and-down and advancing-and-retreating linear motions in which the pallet, after lifted, is conveyed linearly to a site upward of the relay changing position 'b' or the machine-side changing position 'c'. It is then further lowered, thereby advancing and retreating the preceding-process pallet or the next-process pallet. Thus there are very few cases where the relay changer mechanism 7 is not adaptable to the structure of the changing position 'c' portion of the machine tool, so that the application ranges can also be widened.

Also, since the second advance-and-retreat drive mechanism (double-speed mechanism) 15 for advancing and retreating the second arm member 13 by making use of the advancing-and-retreating motions of the first arm member 12 is provided between the first arm member 12 and the second arm member 13 supported by the first arm member 12 in the relay changer mechanism 7, the second arm member 13 can be advanced and retreated to a greater extent only by driving the first arm member 12. This allows the working space A to be ensured more securely while suppressing any complication in the structure of the device.

Furthermore, the speed-increasing mechanism is constructed so that the first arm member 12 is equipped with the lower chain mechanism (driving-side chain mechanism) and the upper chain mechanism (driven-side chain mechanism). This means the sprockets 33a, 33b on one end side of the two chain mechanisms are connected to each other so as to be rotated together by the spline shaft 30, while the chain 36 of the lower chain mechanism is fixed to the frame member. Moreover, the chain 40 of the upper chain mechanism is coupled to the second arm member 13 via the drive rollers 41. Thus, the second arm member 13 can be advanced and retreated to a greater extent only by driving the first arm member 12 to advance and retreat.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2000-328301 filed Oct. 27, 2000 is hereby incorporated by reference.

What is claimed is:

1. A machine tool comprising:
   a pallet changer including a changer body disposed in front of a machine body for automatically changing a preceding-process pallet loaded with a machined workpiece thereon with a next-process pallet loaded with an unmachined workpiece thereon, wherein a working space is provided between said machine body and said pallet changer, said pallet changer including a relay changer mechanism for advancing and retreating at least one of the preceding-process pallet and the next-process pallet between the machine-side changing position and a relay changing position; and
   a cover surrounding said pallet changer and extending toward and contacting said machine body, said cover including access means for accessing a working space so that an operator can enter the working space through said access means to perform maintenance on said machine tool.

2. The machine tool according to claim 1, wherein said pallet changer includes
   a pivotal changer mechanism for changing the preceding-process pallet with the next-process pallet by a pivoting operation in a position between the relay changing position and the setup position.

3. The machine tool according to claim 2, wherein the relay changer mechanism advances and retreats the preceding-process pallet and the next-process pallet through up-and-down and advance-and-retreat linear motions for lifting the preceding-process pallet disposed in the machine-side changing position and the next-process pallet disposed in the relay changing position, thereafter linearly conveying the preceding-process pallet to a site upward of the relay changing position and the next-process pallet to a site upward of the machine-side changing position, and further lowering the preceding-process pallet to the relay changing position and the next-process pallet to the machine-side changing position.

4. The machine tool according to claim 3, further comprises
   a first arm member mounted on a frame member so as to be advanceable and retreatable, and
   a second arm member supported on the first arm member so as to be advanceable and retreatable relative to the first arm member, and
   a speed-increasing mechanism is further provided between the first arm member and the second arm member for advancing and retreating the second arm member by making use of the advance-and-retreat motions of the first arm member.

5. The machine tool according to claim 4, wherein the speed-increasing mechanism is structured so that the first arm member is equipped with at least one of a driving-side chain mechanism and a driven-side chain mechanism, each of said driving-side chain mechanism and said driven-side chain mechanism having an endless chain on a pair of sprockets disposed so as to be spaced from each other in an advance-and-retreat direction, said sprockets on one side of the driving-side and driven-side chain mechanisms being vertically coaxial and rotationally connected to each other perpendicular to a direction of elongation of at least one of said first arm member and said second arm member, the endless chain of the driving-side chain mechanism being fixed to the frame member and the endless chain of the driven-side chain mechanism being connected to the second arm member.

6. A machine tool comprising:

a pallet changer disposed in front of a machine body for automatically changing a preceding-process pallet loaded with a machined workpiece thereon with a next-process pallet loaded with an unmachined workpiece thereon, wherein a working space is provided between said machine body and said pallet changer, said pallet changer comprising a first arm member, a second arm member and a speed-increasing mechanism provided between said first arm member and said second arm member for advancing and retreating said second arm member by making use of horizontal advance-and-retreat motions of the second arm member relative to said first arm member, and said pallet changer further including means for vertically moving the second arm member relative to said first arm member.

7. A machine tool comprising:

a pallet changer disposed in front of a machine body for automatically changing a preceding-process pallet loaded with a machined workpiece thereon with a next-process pallet loaded with an unmachined workpiece thereon, wherein a working space is provided between said machine body and said pallet changer, said pallet changer comprises a first arm member, a second arm member and a speed-increasing mechanism provided between said first arm member and said second arm member, said speed-increasing mechanism including a driving-side chain mechanism and a driven-side chain mechanism, each of said driving-side chain mechanism and said driven-side chain mechanism have an endless chain on a pair of sprockets disposed so as to be spaced from each other in an advance-and-retreat direction, said sprockets on one side of the driving-side and driven-side chain mechanisms being vertically coaxial and rotationally connected to each other perpendicular to a direction of elongation of at least one of said first arm member and said second arm member.

* * * * *